United States Patent
Dewey et al.

(10) Patent No.: US 10,394,482 B2
(45) Date of Patent: Aug. 27, 2019

(54) SNAP TREE ARBITRARY REPLICATION

(71) Applicant: SEAGATE TECHNOLOGY LLC, Cupertino, CA (US)

(72) Inventors: Douglas W. Dewey, Longmont, CO (US); Kenneth F. Day, Tucson, AZ (US); Ian R. Davies, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 89 days.

(21) Appl. No.: 15/099,366

(22) Filed: Apr. 14, 2016

(65) Prior Publication Data

US 2017/0300232 A1    Oct. 19, 2017

(51) Int. Cl.
*G06F 12/00* (2006.01)
*G06F 3/06* (2006.01)

(52) U.S. Cl.
CPC .......... *G06F 3/065* (2013.01); *G06F 3/0605* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 6,792,540 B1* | 9/2004 | Smith ................. | G06F 21/6227 707/999.009 |
| 7,404,051 B2 | 7/2008 | Shitomi | |
| 7,567,991 B2 | 7/2009 | Armangau et al. | |
| 8,037,026 B1* | 10/2011 | Singhal ................. | G06F 3/0605 707/639 |
| 8,332,354 B1 | 12/2012 | Chatterjee et al. | |
| 8,473,697 B1* | 6/2013 | Tiwari ................... | G06F 3/065 707/639 |
| 8,805,786 B1 | 8/2014 | Natanson | |
| 9,495,253 B2* | 11/2016 | Pittelko .............. | G06F 11/1451 |
| 9,665,306 B1* | 5/2017 | Patwardhan ............ | G06F 3/065 |
| 10,140,053 B1* | 11/2018 | Ayzenberg ............. | G06F 3/065 |
| 10,228,879 B1* | 3/2019 | Peleg ...................... | G06F 3/065 |
| 2005/0144407 A1 | 6/2005 | Colgrove et al. | |
| 2007/0220071 A1* | 9/2007 | Anzai ................... | G06F 3/0619 |
| 2010/0082921 A1 | 4/2010 | Thompson et al. | |
| 2010/0228919 A1 | 9/2010 | Stabrawa et al. | |
| 2013/0297899 A1* | 11/2013 | Kawaguchi ........... | G06F 3/0613 711/162 |
| 2014/0059007 A1 | 2/2014 | Akirav et al. | |
| 2014/0081911 A1 | 3/2014 | Deshpande | |

(Continued)

*Primary Examiner* — Prasith Thammavong
(74) *Attorney, Agent, or Firm* — Holland & Hart LLP

(57) ABSTRACT

Systems and methods for replicating a snapshot of a volume are described. In one embodiment, a storage controller of a storage system may be operable to initialize a first replication process between a first storage volume of the first storage system and a second storage volume of a second storage system, copy content from a first system snapshot of the first storage volume to a second system snapshot of the first storage volume, and copy content from a first user snapshot of the first storage volume to the first system snapshot of the first storage volume. In some cases, a system snapshot is not accessible to a user and a user snapshot is accessible to the user. In some cases, at least one of the system snapshot and the user snapshot include a point in time capture of data on the first storage volume.

20 Claims, 8 Drawing Sheets

(56) References Cited

U.S. PATENT DOCUMENTS

| | | |
|---|---|---|
| 2015/0066857 A1 | 3/2015 | Dayal et al. |
| 2015/0127661 A1* | 5/2015 | Zamir ............... G06F 17/30091 707/748 |
| 2015/0127768 A1* | 5/2015 | Zamir ................ H04L 67/1097 709/215 |
| 2015/0370502 A1 | 12/2015 | Aron et al. |
| 2016/0117163 A1 | 4/2016 | Fukui et al. |
| 2016/0170823 A1* | 6/2016 | Miller ................ G06F 11/0772 714/56 |
| 2016/0210203 A1* | 7/2016 | Kumarasamy .......... G06F 16/27 |
| 2016/0335278 A1 | 11/2016 | Tabaaloute et al. |
| 2017/0075615 A1* | 3/2017 | Imazaki ................ G06F 11/108 |
| 2017/0206016 A1 | 7/2017 | Sun et al. |
| 2017/0249222 A1* | 8/2017 | Patnaik ................ G06F 3/0619 |

\* cited by examiner

SNAP TREE ARBITRARY REPLICATION

SUMMARY

According to at least one embodiment, a first storage system for replicating a snapshot of a volume is described. In one embodiment, the first storage system may include a storage controller. In some embodiments, the storage controller may be operable to initialize a first replication process between a first storage volume of the first storage system and a second storage volume of a second storage system, copy content from a first system snapshot of the first storage volume to a second system snapshot of the first storage volume, and copy content from a first user snapshot of the first storage volume to the first system snapshot of the first storage volume. In some cases, a system snapshot is not accessible to a user and a user snapshot is accessible to the user. In some cases, at least one of the system snapshot and the user snapshot include a point in time capture of data on the first storage volume.

In some embodiments, the storage controller may be operable to copy content from a first system snapshot of the second storage volume to a second system snapshot of the second storage volume. In some cases, the storage controller may be operable to copy the content from the first system snapshot of the first storage volume, updated with content from the first user snapshot of the first storage volume, to the first system snapshot of the second storage volume. In some cases, the storage controller may be operable to create a first user snapshot of the second storage volume and copy content from the first system snapshot of the second storage volume, updated with content from the first system snapshot of the first storage volume, to the first user snapshot of the second storage volume.

In some embodiments, the storage controller may be operable to modify data on the first storage volume since the first replication process. In some cases, modifying data on the first storage volume may include at least one of adding new data to the first storage volume, removing data from the first storage volume, and modifying existing data on the first storage volume. The storage controller may be operable to initialize a second replication process between the first storage volume and the second storage volume. In some cases, the storage controller may be operable to generate a second user snapshot of the first storage volume after modifying the data on the first storage volume and copy content from the first system snapshot on the first storage volume to the second system snapshot on the first storage volume.

In some embodiments, the storage controller may be operable to copy content from the second user snapshot of the first storage volume to the first system snapshot of the first storage volume and compare content on the updated first system snapshot of the first storage volume to content on the updated second system snapshot of the first storage volume. In some cases, the storage controller may be operable to identify delta data on the updated first system snapshot of the first storage volume based on the comparing. In some cases, delta data may include at least one of data on the updated first system snapshot of the first storage volume that is not on the updated second system snapshot of the first storage volume and data on the updated second system snapshot of the first storage volume that is not on the updated first system snapshot of the first storage volume.

In some embodiments, the storage controller may be operable to copy content from the first system snapshot on the second storage volume to the second system snapshot on the second storage volume and copy the delta data on the first system snapshot of the first storage volume to the first system snapshot of the second storage volume. In some cases, the storage controller may be operable to generate a second user snapshot on the second storage volume and copy content from the first system snapshot of the second storage volume, updated with the delta data, to the second user snapshot of the second storage volume.

An apparatus configured for replicating a snapshot of a volume is also described. The apparatus may include a storage drive configured for incorporation into a data center or private cloud environment and a storage controller. The storage controller may be operable to initialize a first replication process between a first storage volume and a second storage volume, copy content from a first system snapshot on the first storage volume to a second system snapshot on the first storage volume, and copy content from a first user snapshot of the first storage volume to the first system snapshot of the first storage volume. In some cases, a system snapshot is not accessible to a user and a user snapshot is accessible to the user. Additionally, or alternatively, at least one of the system snapshot and the user snapshot include a point in time capture of data on the first storage volume.

A computer-implemented method for replicating a snapshot of a volume is described. In one embodiment, the method may include initializing a first replication process between a first storage volume of the first storage system and a second storage volume of a second storage system, copying content from a first system snapshot of the first storage volume to a second system snapshot of the first storage volume, and copying content from a first user snapshot of the first storage volume to the first system snapshot of the first storage volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

DETAILED DESCRIPTION OF EXEMPLARY EMBODIMENTS

Figure 1:
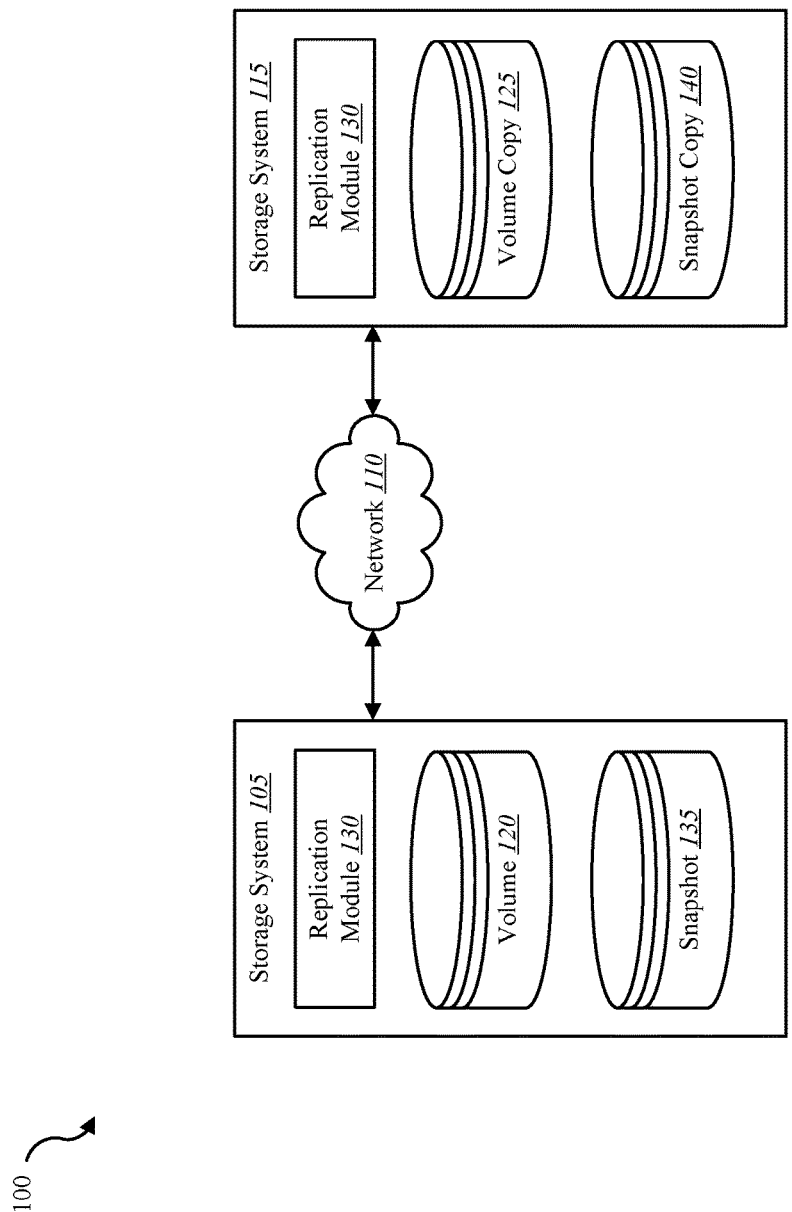
FIG. 1 is a block diagram illustrating one embodiment of an environment in which the present systems and methods may be implemented.

The systems and methods described herein relate to replicating a snapshot of a volume. More specifically, the systems and methods described herein relate to replicating a snapshot of a volume in relation to a distributed data system such as a cloud storage system as one example. Cloud services are popular because they make it convenient to share documents between different users or for the same user across any machine with Internet access.

The present systems and methods include operations to replicate a primary volume to a secondary volume. One form of replication may be done by taking an internal snapshot image of a volume. One problem with this form of replication is integrating with storage management software (including those managed as the operating system level) that have the ability to take an automatic or manual snapshot or backup copy of files or volumes, but no concept of replication. To address having a way to integrate with management systems, the present systems and methods enhance asynchronous replication (AR) by adding a new function that allows a user to specify the replication of an arbitrary snapshot in the hierarchy of volumes and snapshots whenever a user desires or management software is instructed to do so, while enabling ongoing replications of the original user volume. In some embodiments, the storage management software may be a volume shadow copy service (VSS).

Existing models of replication may include (a) allow specifying for the replication of a volume (like AR); or (b) replicating only snapshots of the volume. The present systems and methods may add one or more of: (1) enabling mixing of the two models, enabling replication of both the volume and user snapshots, providing greater control in failover configuration capability; (2) simplifying the user model by defining a single replication that can be used in several ways; and (3) enabling replication to apply not only to a specific volume, but to any volume or snapshot of a storage system.

The present systems and methods enable a user to issue a replication on a defined replication set, but also provide an additional parameter enabling the user to specify any snapshot in a snapshot tree of the base volume that has a replication set defined on it. In some embodiments, a snapshot tree may include a hierarchy of snapshots. For example, the snapshot tree may include at least a previous snapshot of the base volume and a current snapshot of the base volume. In some cases, the contents of the current snapshot may include both the base volume and the previous snapshot.

With the present systems and methods, when a sync job completes on the primary storage system, the systems and methods create a snapshot on the secondary or remote storage system. With the present systems and methods, at the start of a sync job, instead of moving a data image from the base volume to the system managed internal snap, the systems and methods move the data from the user specified volume to an internal system managed snap. In some embodiments, the storage system may include one or more virtual volumes, enabling one or more aspects of the present systems and methods. The one or more virtual volumes may include a paged storage component. At the end of the sync job, instead of moving the replicated data to the secondary volume, a new user viewable snapshot may be created. In some embodiments, at least some moving of data images may be based not on actual data transfers but on page table updates.

In one embodiment, at the start of a sync job, instead of taking the image of data from the base volume the system may take an image from a user specified snapshot. At the end of the sync job, instead of moving the transferred data image to the base volume (secondary volume), the system may instead create a new snapshot and puts the data image in the new snapshot and make the new snapshot viewable to the user upon completing the sync job.

In one embodiment, after creating a peer connection and replication set, volumes may be replicated between the storage systems. In some embodiments, there may be two kinds of replications: an initial replication and subsequent replications. In some configurations, the initial replication may create a full copy of the primary volume to the secondary volume. A subsequent replication may be completed by taking a hidden snapshot of the primary volume and comparing the changes to the last time the hidden snapshot was taken of the primary volume. The system may write any changes it finds on the hidden primary snapshot to the hidden secondary snapshot, after which the hidden secondary snapshot may be promoted to the secondary volume. The progress and status of the initial and subsequent replications may be tracked and displayed. A replication may be initiated manually and/or automated such as by using a schedule.

In one embodiment, for both a primary and secondary storage system, internal system snapshots of the respective base volume of each system may be created. For example, first and second system snapshots (S1 and S2) may be created of the base volume on the primary system, and first and second system snapshots (S1 and S2) may be created of the base volume on the secondary system. After the creation of the replication set, the primary and secondary base volumes and the respective S1 and S2 either contain or point to the same data.

Between the time that the replication set was created and the initial replication occurs, it is possible that hosts have written additional data to the primary volume. In one embodiment, during initial replication, the user may initiate replication on the primary system. On both the primary and secondary systems, the S1 data of the respective system replaces the S2 contents on the same respective system. For example, data from S1 of the primary system replaces the data on S2 of the primary system, etc. The current primary volume data, which might be different than when the replication set was created, replaces the contents of S1 on the primary system. The S1 data, which matches that of the primary volume, is replicated in its entirety to its S1 counterpart on the secondary system and replaces the data that this S1 contains. The S1 data on the secondary system replaces the data that the secondary volume contains. The contents of the primary and secondary volumes are then synchronized.

During the initial replication, the entire contents of the primary volume may be replicated to the secondary volume. In subsequent replications, only data that is new or modified since the last replication operation may be replicated. In one embodiment, a snapshot of the primary volume data from the last replication may be compared with a current snapshot of the primary volume. In one embodiment, the user initiates replication on the primary system. On each respective primary and secondary system, the S1 data of one system replaces the S2 contents of the same system. Next, the current primary volume data replaces the contents of S1 on the primary system. The S1 data on the primary system, which now matches that of the primary volume, may be compared to the S2 data on the primary system. Only the data that is the delta between S1 and S2 is replicated to its S1 counterpart on the secondary system, which is updated with the delta data. The S1 data on the secondary system then replaces the data that the secondary volume contains. The contents of the primary and secondary volumes are then synchronized.

FIG. 1 is a block diagram illustrating one embodiment of an environment 100 in which the present systems and methods may be implemented. In some embodiments, the systems and methods described herein may be performed on a client and/or server device. The environment 100 may include storage system 105, network 110, and storage system 115. In some embodiments, environment 100 may depict a user view of storage system 105 and/or 115. Thus, a user may view both a storage volume 120 and a snapshot 135 of storage system 105 and/or both a storage volume copy 125 and a snapshot copy 140 of storage system 115.

Examples of the storage systems 105 and/or 115 include mobile devices, smart phones, personal computing devices, computers, laptops, desktops, servers, a set top box providing access to media content, gaming consoles, home automation systems, data storage systems, data enclosures, and generally any computing device able to connect to a data communication network. Examples of storage systems 105 and/or 115 may also include a cloud server, a data server, a corporate server, a home automation server, etc.

In some configurations, storage system 105 may include a replication module 130, a storage volume 120, and a snapshot 135. Replication module 130 may be configured to replicate data on storage system 105 to storage system 115. In some embodiments, snapshot 135 includes a point in time copy of data on storage volume 120. Thus, snapshot 135 may include at least a portion of the data, applications, settings, etc., on storage volume 120 at a particular point in time. In some embodiments, snapshot 135 may be captured as a result of a user initiating a snapshot of storage volume 120. In some configurations, snapshot 135 is viewable to a user. In some embodiments, snapshot 135 may be readable and writable by a user. In some cases, snapshot 135 may be referred to as a user snapshot because snapshot 135 is initiated by a user and/or because snapshot 135 is viewable by a user.

In some configurations, storage system 115 may include replication module 130, a storage volume copy 125, and a snapshot copy 140. In some cases, storage volume copy 125 may include a replicated copy of storage volume 120 of storage system 105. Additionally, snapshot copy 140 may include a replicated copy of snapshot 135 of storage system 105. In some embodiments, storage volume copy 125 may be configured as a read-only storage volume. In some configurations, snapshot copy 140 may be mounted as a volume on storage system 115 and configured as viewable to a user. In some cases, snapshot copy 140 may be readable and writable by a user. In some embodiments, snapshot copy 140 may be referred to as a user snapshot because snapshot copy 140 is initiated by a user and/or because snapshot 135 is viewable by a user. In some embodiments, replication module 130 may be configured to replicate data between storage system 105 and storage system 115. In some embodiments, storage systems 105/115 may include one or more software applications and/or web-based applications (e.g., any combination of JavaScript, hypertext markup language (HTML), and cascading style sheets (CSS)), configured in conjunction with replication module 130 to enable certain operations described herein.

In some embodiments, storage system 105 may communicate with storage system 115 via network 110. Examples of network 110 may include cloud networks, local area networks (LAN), wide area networks (WAN), virtual private networks (VPN), wireless networks (using 802.11, for example), cellular networks (using 3G and/or LTE, for example), etc. In some configurations, the network 110 may include the Internet.

In some cases, storage system 105 and/or storage system 115 may each include a replication module where at least a portion of the functions of replication module 130 are performed separately and/or concurrently on storage system 105 and/or storage system 115. Replication module 130 may be configured to replicate data stored on storage systems 105 and/or 115. Further details regarding the replication module 130 are discussed below.

Figure 2:
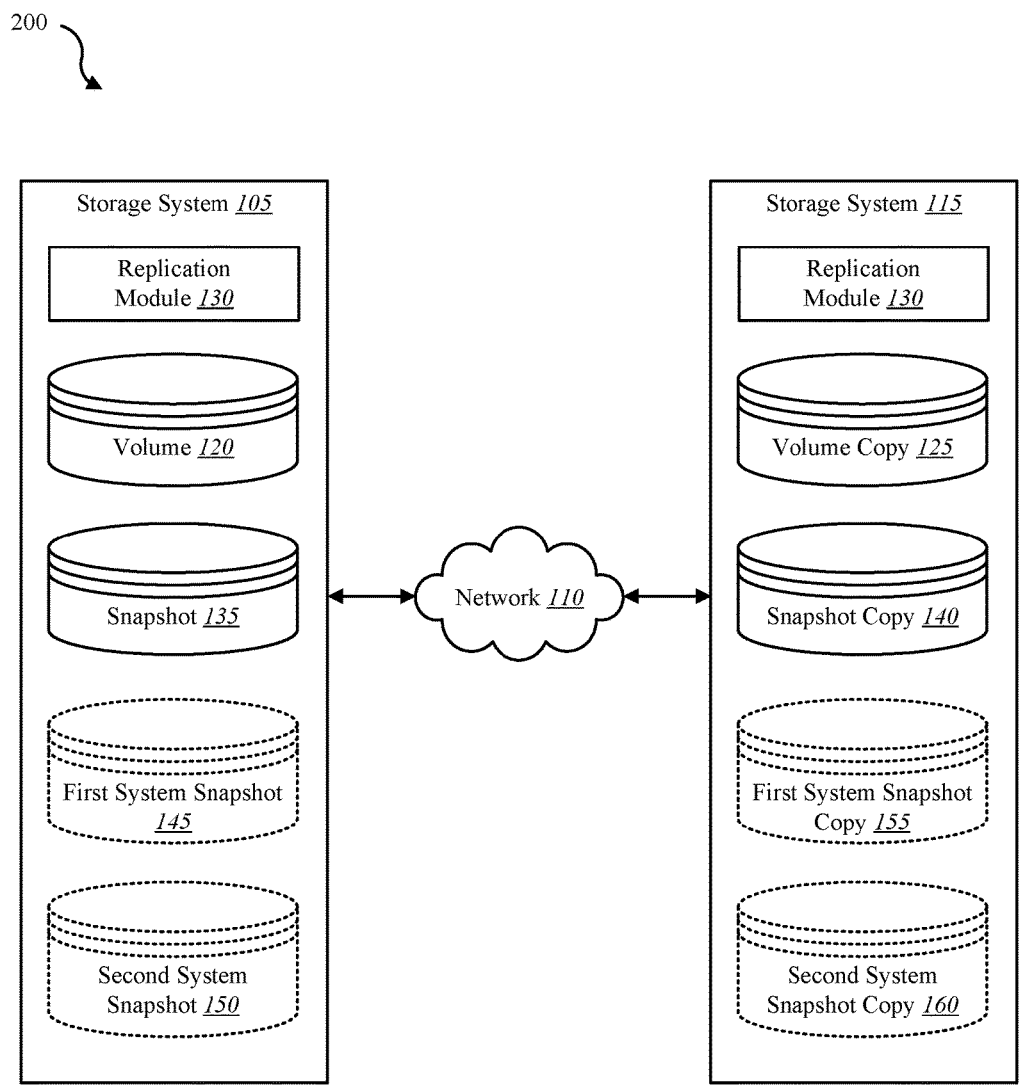
FIG. 2 is a block diagram illustrating one embodiment of an environment in which the present systems and methods may be implemented.

FIG. 2 is a block diagram illustrating one embodiment of an environment 200 in which the present systems and methods may be implemented. In some embodiments, the systems and methods described herein may be performed on a client and/or server device. The environment 200 may include storage system 105, network 110, and storage system 115. In some embodiments, environment 200 may depict a system view of storage system 105 and/or 115. Thus, in addition to storage volume 120 and snapshot 135 of storage system 105 being viewable, a system view of storage system 105 may also include at least system snapshots 145 and 150 being viewable to storage system 105. In some embodiments, like snapshot 135, system snapshots 145 and 150 may include copies of data at particular points in time, but instead of being initiated and viewable by a user, system snapshots 145 and 150 may be initiated and managed by a system (e.g., storage system 105) and configured to be hidden to a user. Likewise, system snapshot copies 155 and 160 of storage system 115 may be initiated by a system (e.g., storage system 105 and/or 115), viewable by the system, and hidden to a user.

In some embodiments, replication module 130 may initiate and control system snapshots such as system snapshots 145/150 and/or 155/160. In one embodiment, storage volume 120 may be created and mounted on storage system 105. Upon creating storage volume 120, replication module 130 may create first system snapshot 145 and second system snapshot 150. Data written to storage volume 120 may be replicated to system snapshots 145 and 150 as the data is written to storage volume 120. In some configurations, replication module 130 may replicate storage volume 120 to storage system 115. The copy of storage volume 120 may be stored as storage volume copy 125 on storage system 115. Replication module 130 may create first system snapshot copy 155 and second system snapshot copy 160 on storage system 115. In some cases, replication module 130 may copy content from storage volume copy 125 to at least one of system snapshot copies 155 and 160.

As one example, a user of storage system 105 may create snapshot 135 (i.e., a user snapshot initiated and viewable by the user). Upon initiating snapshot 135, replication module 130 may capture a point in time copy of data on storage volume 120. Replication module 130 may use this point in time copy of storage volume 120 to create snapshot 135.

Thus, snapshot 135 may contain the point in time copy of storage volume 120. Upon copying the point in time copy of storage volume 120 into snapshot 135, replication module 130 may copy content in first system snapshot 145 into second system snapshot 150. Replication module 130 may then copy content in snapshot 135 to first system snapshot 145. In some cases, replication module 130 may then copy content in first system snapshot copy 155 to second system snapshot copy 160. In some embodiments, replication module 130 may copy content from first system snapshot 145, updated with content from snapshot 135, to first system snapshot copy 155 on storage system 115. In some embodiments, replication module 130 may identify a delta of data between (a) data on first system snapshot 145 before content from snapshot 135 is copied to first system snapshot 145 and (b) data on first system snapshot 145 after content from snapshot 135 is copied to first system snapshot 145. In some cases, replication module 130 may copy only the identified delta of data from the first system snapshot 145 on storage system 105 to the first system snapshot copy 155 on storage system 115, thus conserving bandwidth and system resources and minimizing the time the data transfer takes. In some embodiments, replication module 130 may make snapshot 135 on storage system 105 and/or snapshot copy 140 on storage system 115 viewable to a user. Further details regarding the replication module 130 are discussed below.

Figure 3:
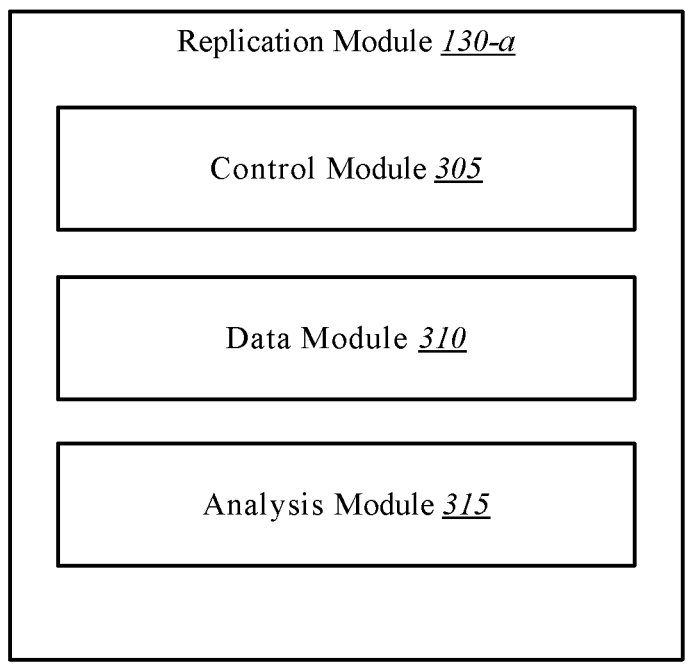
FIG. 3 is a block diagram illustrating one example of a replication module.

FIG. 3 is a block diagram illustrating one example of a replication module 130-a. Replication module 130-a may be one example of replication module 130 depicted in FIGS. 1 and/or 2. As depicted, replication module 130-a may include control module 305, data module 310, and analysis module 315. In one embodiment, at least one aspect of replication module 130-a may include software and/or hardware elements of a network data storage system. For example, the replication module 130-a may be part of a cloud storage application configured to store data in a secured data environment.

In one embodiment, replication module 130 may operate in conjunction with a storage controller. In one embodiment, control module 305 may initialize a first replication process between a first storage volume of a first storage system and a second storage volume of a second storage system. In some embodiments, the second storage volume may be a replicated copy of the first storage volume. In some cases, the first storage volume may be read/write enabled, and the second storage volume may be read-only. In some embodiments, the storage controller is implemented as a physical hardware device.

In some embodiments, control module 305 may generate a first user snapshot of the first storage volume. In some cases, control module 305 may generate the first user snapshot based on a user of the first storage system requesting the first user snapshot be created. In some embodiments, data module 310 may copy content from a first system snapshot on the first storage volume to a second system snapshot on the first storage volume and copy content from a first user snapshot of the first storage volume to the first system snapshot of the first storage volume. Accordingly, control module 305 may create a system backup of the data on the first user snapshot of the first storage volume that includes the latest data and settings on the first storage volume.

In some cases, a system snapshot is not accessible to a user while a user snapshot is accessible to the user. Additionally, or alternatively, at least one of the system snapshot and the user snapshot include a point in time capture of data on the first storage volume. In some embodiments, a user initiates creating a user snapshot while a storage system initiates creating a system snapshot. In some configurations, a user snapshot is viewable and/or accessible by a user of the storage system while a system snapshot is not viewable and/or accessible to the user.

In some embodiments, data module 310 may copy content from a first system snapshot on the second storage volume to a second system snapshot on the second storage volume. In some embodiments, the first storage system creates the first and second system snapshots and makes each inaccessible to a user of the first storage system.

In some embodiments, data module 310 may copy the content from the first system snapshot of the first storage volume, updated with content from the first user snapshot, to the first system snapshot of the second storage volume. In some embodiments, a storage controller of the first storage system may create both the system snapshots of the first storage system as well as the system snapshots of the second storage system. Alternatively, a first storage controller of the first storage system creates system snapshots of the first storage system and a second storage controller of the second storage system creates system snapshots of the second storage system.

In some embodiments, control module 305 may create a first user snapshot on the second storage volume. In some cases, control module 305 may create the first user snapshot on the second storage volume based at least in part on the creation of the first user snapshot of the first storage volume. In some embodiments, data module 310 may copy content from the first system snapshot of the second storage volume, updated with content from the first system snapshot of the first storage volume, to the first user snapshot of the second storage volume.

In some cases, control module 305 may receive a command to modify data on the first storage volume. In some cases, modifying data on the first storage volume may include at least one of adding new data to the first storage volume, removing data from the first storage volume, and modifying existing data on the first storage volume. Accordingly, control module 305 may modify data on the first storage volume since the first replication process. In some embodiments, control module 305 may initialize a second replication process between the first storage volume and the second storage volume.

In some embodiments, control module 305 may generate a second user snapshot of the first storage volume after modifying the data on the first storage volume. In some cases, control module 305 may generate the second user snapshot based on a user of the first storage system requesting the second user snapshot be created. In some embodiments, data module 310 may copy content from the first system snapshot on the first storage volume to the second system snapshot on the first storage volume. In some embodiments, data module 310 may copy content from the second user snapshot of the first storage volume to the first system snapshot of the first storage volume. Accordingly, control module 305 may create a system backup of the data on the second user snapshot of the first storage volume that includes the latest data and settings on the first storage volume.

In some embodiments, analysis module 315 may compare content on the updated first system snapshot of the first storage volume, updated with content on the second user snapshot of the first storage volume, to content on the updated second system snapshot of the first storage volume, updated with content previously on the first system snapshot of the first storage volume. In some embodiments, control module 305 may identify delta data on the updated first system snapshot of the first storage volume based on the comparing. In some cases, delta data includes at least one of data on the updated first system snapshot of the first storage volume that is not on the updated second system snapshot of the first storage volume and data on the updated second system snapshot of the first storage volume that is not on the updated first system snapshot of the first storage volume.

In some embodiments, data module 310 may copy content from the first system snapshot on the second storage volume to the second system snapshot on the second storage volume. Next, in some embodiments, data module 310 may copy the delta data on the first system snapshot of the first storage volume, updated with data from the second user snapshot of the first storage volume, to the first system snapshot of the second storage volume.

In some embodiments, control module 305 may generate a second user snapshot on the second storage volume. In some embodiments, data module 310 may copy content from the first system snapshot of the second storage volume, updated with the delta data, to the second user snapshot of the second storage volume. Accordingly, control module 305 may create a backup of the data on the second user snapshot of the first storage volume that includes the latest data and settings on the first storage volume and the second storage volume.

Figure 4:
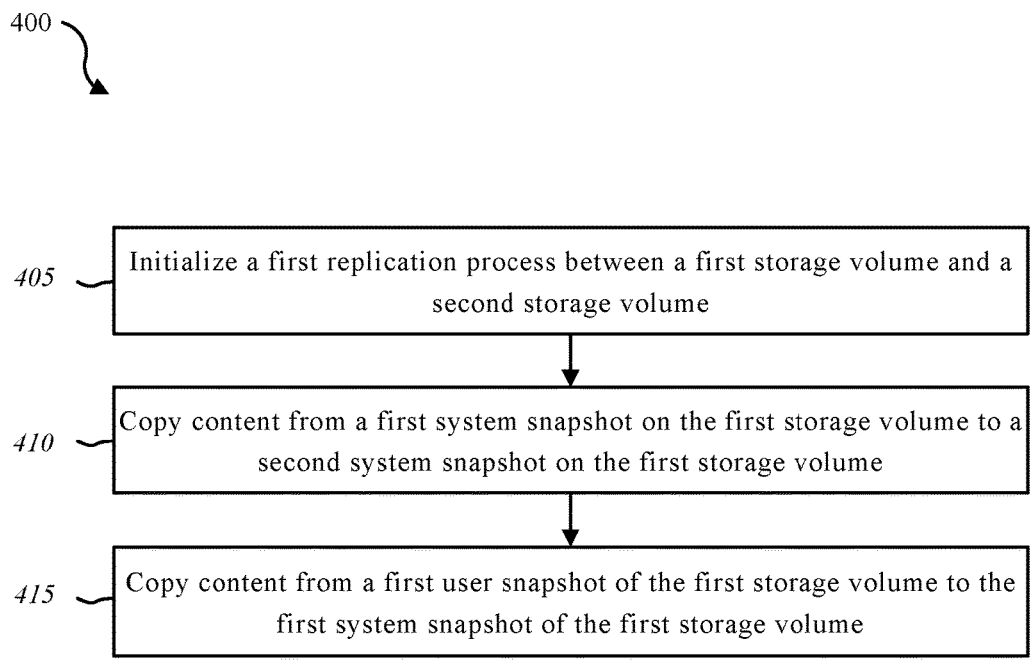
FIG. 4 is a flow diagram illustrating one embodiment of a method for replicating a snapshot of a volume.

FIG. 4 is a flow diagram illustrating one embodiment of a method 400 for replicating a snapshot of a volume. In some configurations, the method 400 may be implemented by the replication module 130 illustrated in FIGS. 1, 2, and/or 3. In some configurations, the method 400 may be implemented in conjunction with an application and/or a user interface of storage system 105/115 in FIG. 1.

At block 405, the method 400 may include initializing a first replication process between a first storage volume and a second storage volume. At block 410, the method 400 may include copying content from a first system snapshot on the first storage volume to a second system snapshot on the first storage volume. At block 415, the method 400 may include copying content from a first user snapshot of the first storage volume to the first system snapshot of the first storage volume.

Figure 5:
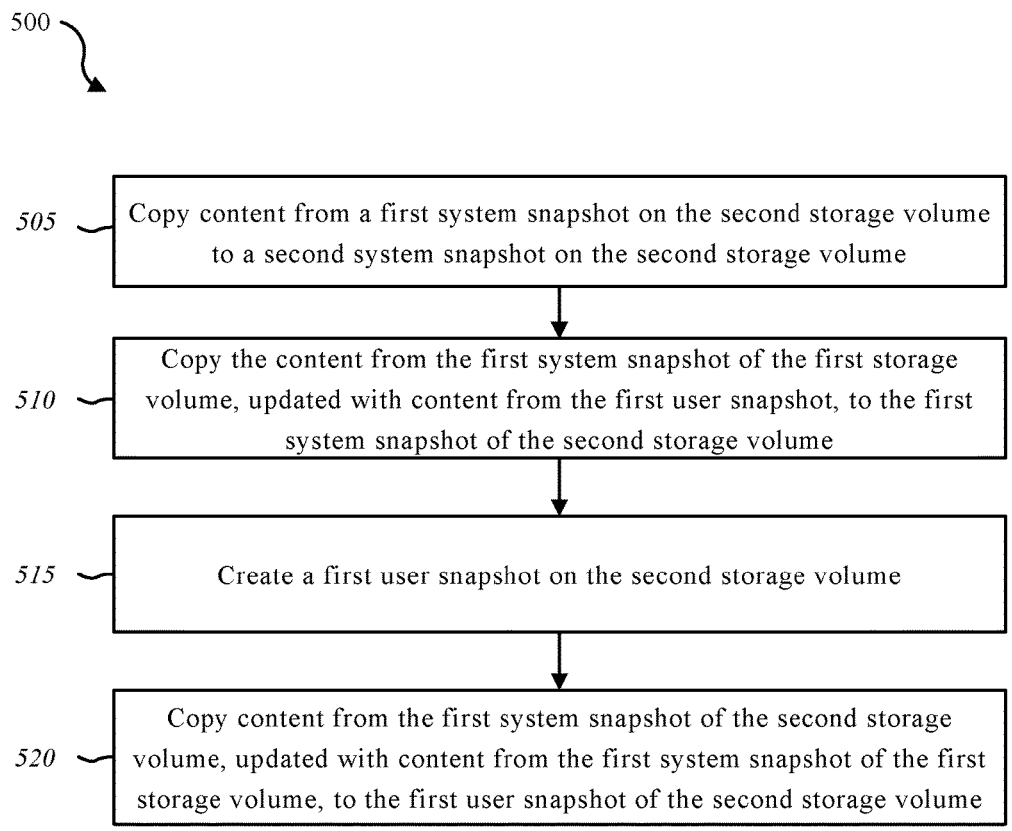
FIG. 5 is a flow diagram illustrating another embodiment of a method for replicating a snapshot of a volume.

FIG. 5 is a flow diagram illustrating another embodiment of a method 500 for replicating a snapshot of a volume. In some configurations, the method 500 may be implemented by the replication module 130 illustrated in FIGS. 1, 2, and/or 3. In some configurations, the method 500 may be implemented in conjunction with an application and/or a user interface of storage system 105/115 in FIG. 1.

At block 505, the method 500 may include copying content from a first system snapshot on the second storage volume to a second system snapshot on the second storage volume. At block 510, the method 500 may include copying the content from the first system snapshot of the first storage volume, updated with content from the first user snapshot, to the first system snapshot of the second storage volume. At block 515, the method 500 may include creating a first user snapshot on the second storage volume. At block 520, the method 500 may include copying content from the first system snapshot of the second storage volume, updated with content from the first system snapshot of the first storage volume, to the first user snapshot of the second storage volume.

Figure 6:
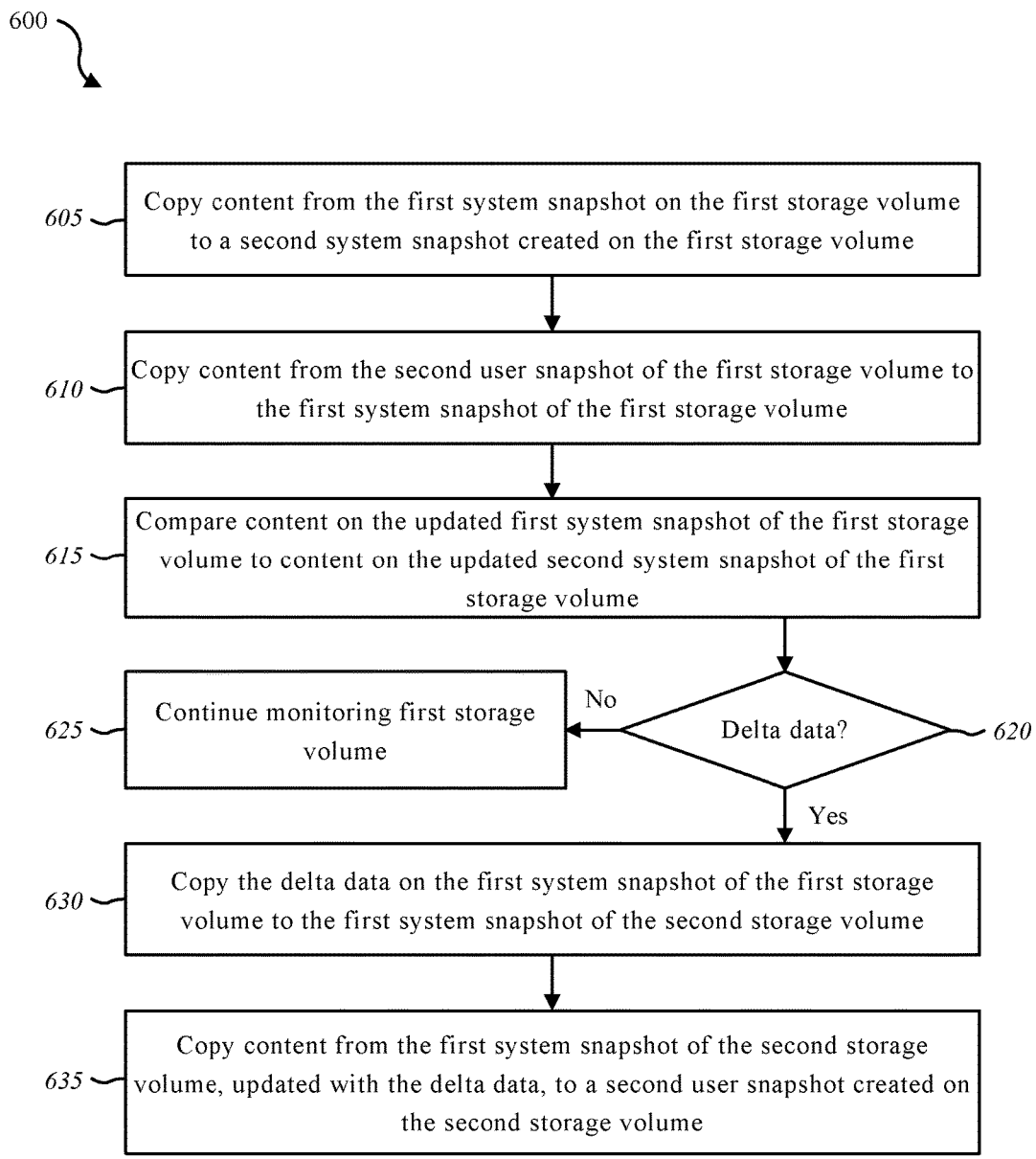
FIG. 6 is a flow diagram illustrating another embodiment of a method for replicating a snapshot of a volume.

FIG. 6 is a flow diagram illustrating another embodiment of a method 600 for replicating a snapshot of a volume. In some configurations, the method 600 may be implemented by the replication module 130 illustrated in FIGS. 1, 2, and/or 3. In some configurations, the method 600 may be implemented in conjunction with an application and/or a user interface of storage system 105/115 in FIG. 1.

Method 600 may be configured to determine whether data on a first storage volume is modified since a first replication process. In some cases, modifying data on the first storage volume may include at least one of adding new data to the first storage volume, removing data from the first storage volume, and modifying existing data on the first storage volume. In some cases, method 600 may be initiated based on method 600 detecting a data modification operation in relation to the first storage volume and determining whether the detected data modification results in delta data, or a change to the data on the first storage volume. At block 605, the method 600 may include copying content from the first system snapshot on the first storage volume to a second system snapshot created on the first storage volume. At block 610, the method 600 may include copying content from the second user snapshot of the first storage volume to the first system snapshot of the first storage volume. At block 615, the method 600 may include comparing content on the updated first system snapshot of the first storage volume to content on the updated second system snapshot of the first storage volume. At block 620, based at least in part on the comparing, the method 600 may determine whether delta data exists. If no delta data is detected based on the comparing, at block 625 the method 600 may continue monitoring the first storage volume for data modifications. On the other hand, the method 600 may include identifying delta data on the updated first system snapshot of the first storage volume based on the comparing. In some cases, delta data may include at least one of data on the updated first system snapshot of the first storage volume that is not on the updated second system snapshot of the first storage volume and data on the updated second system snapshot of the first storage volume that is not on the updated first system snapshot of the first storage volume. At block 630, the method 600 may include copying the delta data on the first system snapshot of the first storage volume to the first system snapshot of the second storage volume. At block 635, the method 600 may include copying content from the first system snapshot of the second storage volume, updated with the delta data, to a second user snapshot created on the second storage volume.

Figure 7:
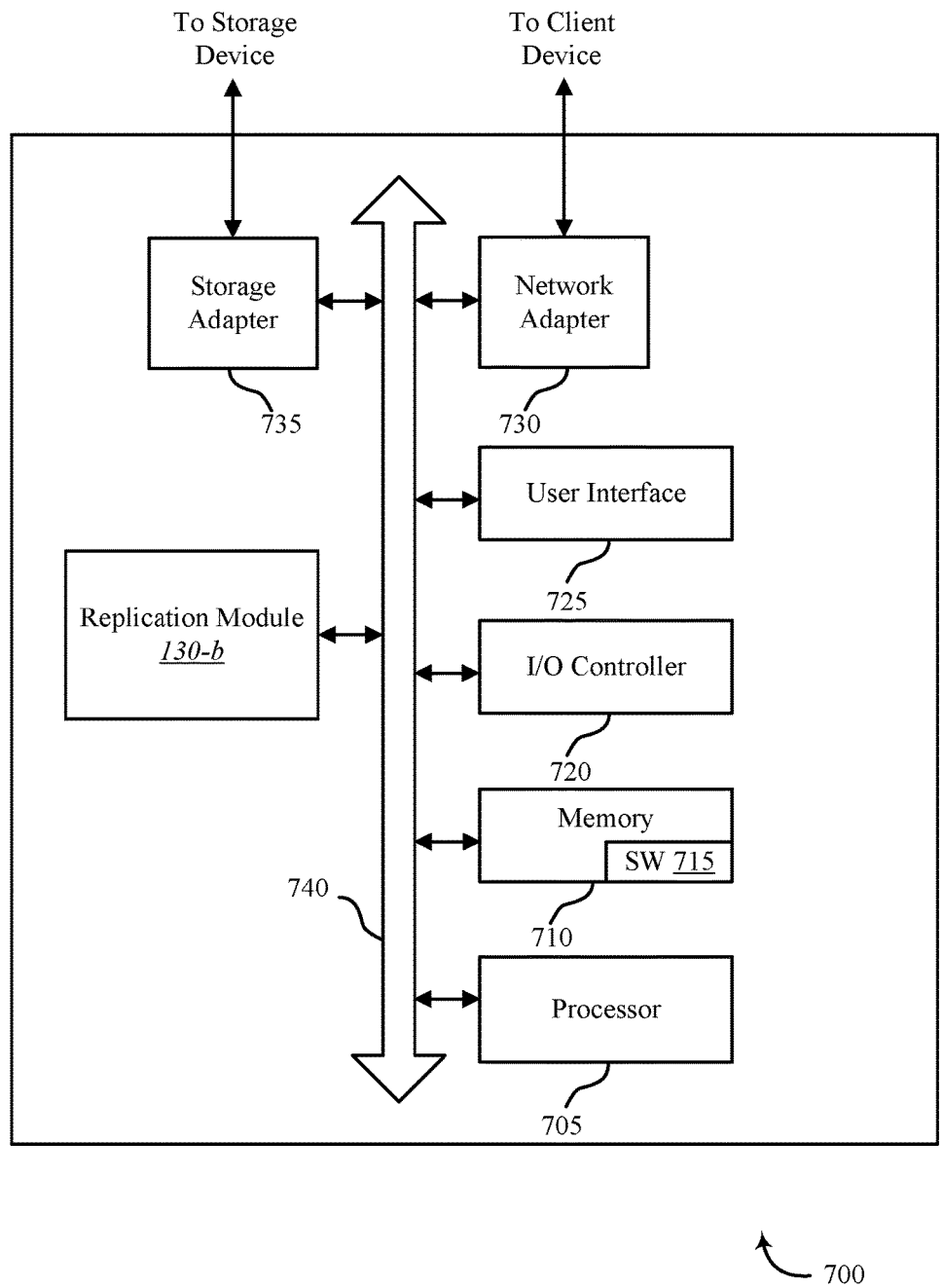
FIG. 7 depicts a block diagram of a computer system suitable for implementing the present systems and methods.

FIG. 7 shows a system 700 for replicating a snapshot of a volume, in accordance with various examples. System 700 may illustrate an apparatus, which may be an example of any one of device or storage system 105 and/or 115 of FIG. 1. System 700 may include components for bi-directional voice and data communications including components for transmitting communications and components for receiving communications. For example, system 700 may communicate bi-directionally with one or more storage devices and/or client systems. This bi-directional communication may be direct (e.g., system 700 communicating directly with a storage system) and/or indirect (e.g., system 700 communicating indirectly with a client device through a server).

System 700 may include a processor module 705, and memory 710 (including software/firmware code (SW) 715), an input/output controller module 720, a user interface module 725, a network adapter 730, and a storage adapter 735. The software/firmware code 715 may be one example of a software application executing on system 700. The network adapter 730 may communicate bi-directionally, via one or more wired links and/or wireless links, with one or more networks and/or client devices. In some embodiments, network adapter 730 may provide a direct connection to a client device via a direct network link to the Internet via a POP (point of presence). In some embodiments, network adapter 730 of system 700 may provide a connection using wireless techniques, including digital cellular telephone connection, Cellular Digital Packet Data (CDPD) connection, digital satellite data connection, and/or another connection. The system 700 may include a replication module 130-b, which may perform the functions described above for the replication module 130 of FIGS. 1 and/or 2.

The signals associated with system 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 730 may enable one or more of WWAN (GSM, CDMA, and WCDMA), WLAN (including Wi-Fi), WMAN (WiMAX) for mobile communications, antennas for Wireless Personal Area Network (WPAN) applications (including RFID and UWB), etc.

One or more buses 740 may allow data communication between one or more elements of system 700 (e.g., processor module 705, memory 710, I/O controller module 720, user interface module 725, network adapter 730, and storage adapter 735, etc.).

The memory 710 may include random access memory (RAM), read only memory (ROM), flash RAM, and/or other types. The memory 710 may store computer-readable, computer-executable software/firmware code 715 including instructions that, when executed, cause the processor module 705 to perform various functions described in this disclosure. Alternatively, the software/firmware code 715 may not be directly executable by the processor module 705 but may cause a computer (e.g., when compiled and executed) to perform functions described herein. Alternatively, the computer-readable, computer-executable software/firmware code 715 may not be directly executable by the processor module 705, but may be configured to cause a computer (e.g., when compiled and executed) to perform functions described herein. The processor module 705 may include an intelligent hardware device, e.g., a central processing unit (CPU), a microcontroller, an application-specific integrated circuit (ASIC), etc.

In some embodiments, the memory 710 may contain, among other things, the Basic Input-Output system (BIOS) which may control basic hardware and/or software operation such as the interaction with peripheral components or devices. For example, the replication module 130-b to implement the present systems and methods may be stored within the system memory 710. Applications resident with system 700 are generally stored on and accessed via a non-transitory computer readable medium, such as a hard disk drive or other storage medium. Additionally, applications can be in the form of electronic signals modulated in accordance with the application and data communication technology when accessed via a network interface (e.g., network adapter 730, etc.).

Many other devices and/or subsystems may be connected to one or may be included as one or more elements of system 700 (e.g., personal computing device, mobile computing device, smart phone, server, internet-connected device, cell radio module, and so on). In some embodiments, all of the elements shown in FIG. 7 need not be present to practice the present systems and methods. The devices and subsystems can be interconnected in different ways from that shown in FIG. 7. In some embodiments, an aspect of some operation of a system, such as that shown in FIG. 7, may be readily known in the art and are not discussed in detail in this application. Code to implement the present disclosure can be stored in a non-transitory computer-readable medium such as one or more of system memory 710 or other memory. The operating system provided on I/O controller module 720 may be a mobile device operating system, desktop operating system, or another known operating system.

The I/O controller module 720 may operate in conjunction with network adapter 730 and/or storage adapter 735. The network adapter 730 may enable system 700 with the ability to communicate with client devices (e.g., storage system 105/115 of FIG. 1), and/or other devices over the network 110 of FIG. 1. Network adapter 730 may provide wired and/or wireless network connections. In some cases, network adapter 730 may include an Ethernet adapter or Fibre Channel adapter. Storage adapter 735 may enable system 700 to access one or more data storage devices. The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 8:
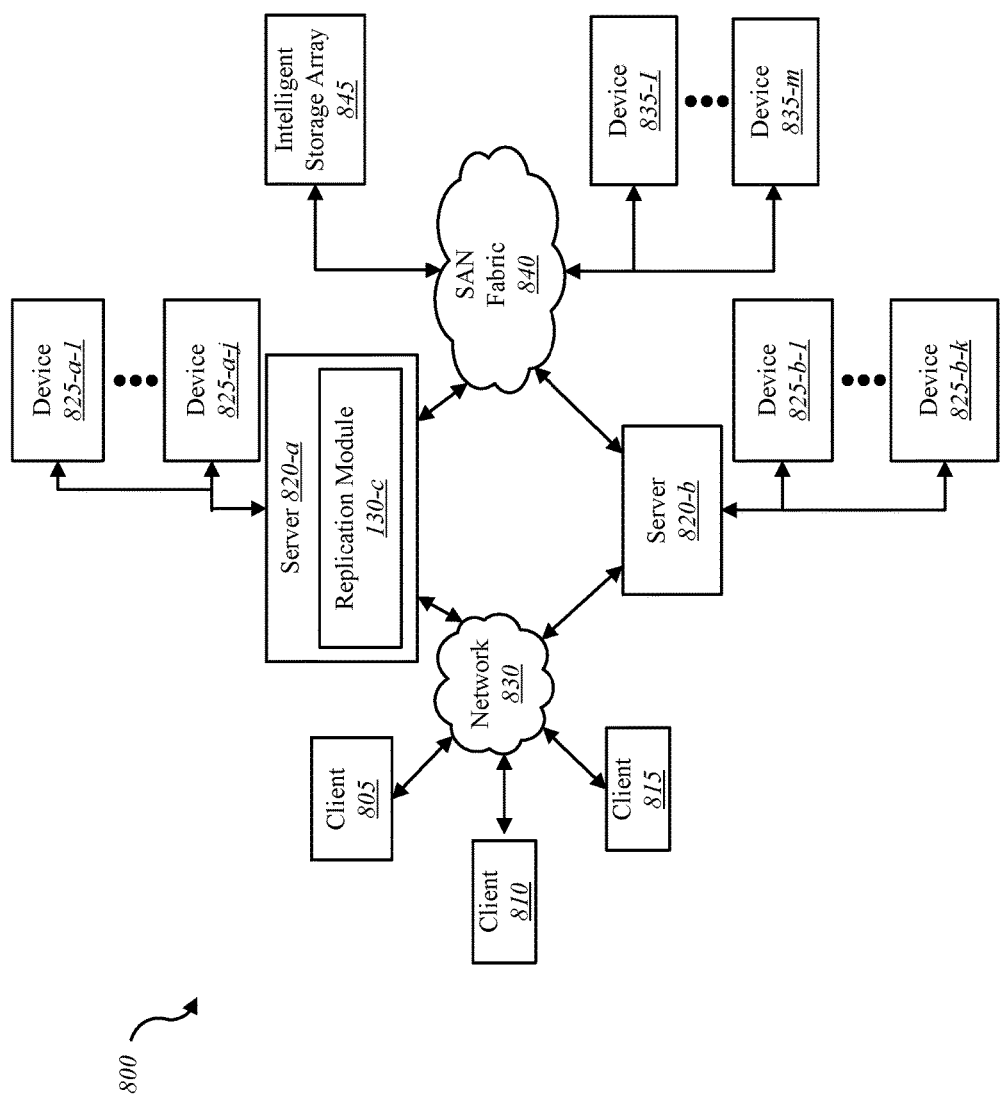
FIG. 8 is a block diagram depicting a network architecture for client systems, as well as storage servers (any of which can be implemented using the computer system).

FIG. 8 is a block diagram depicting a network architecture 800 in which client systems 805, 810 and 815, as well as storage servers 820-a and 820-b (any of which can be implemented using computer system 800), are coupled to a network 830. In one embodiment, replication module 130-c may be located within one of the storage servers 820-a, 820-b to implement the present systems and methods. Replication module 130-c may be one example of replication module 130 depicted in FIGS. 1, 2, 3, and/or 7. The storage server 820-a is further depicted as having storage devices 825-a-l through 825-a-j directly attached, and storage server 820-b is depicted with storage devices 825-b-l through 825-b-k directly attached. SAN fabric 840 supports access to storage devices 835-l through 835-m by storage servers 820-a and 820-b, and so by client systems 805, 810 and 815 via network 830. Intelligent storage array 845 is also shown as an example of a specific storage device accessible via SAN fabric 840.

With reference to computer system 700, network interface 730 or some other method may be used to provide connectivity from each of client computer systems 805, 810 and 815 to network 830. Client systems 805, 810 and 815 are able to access information on storage server 820-a or 820-b using, for example, a web browser or other client software (not shown). Such a client allows client systems 805, 810 and 815 to access data hosted by storage server 820-a or 820-b or one of storage devices 825-a-l to 825-a-j, 825-b-l to 825-b-k, 835-l to 835-m, or intelligent storage array 845. FIG. 8 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the present systems and methods and their practical applications, to enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A system comprising:
a storage controller operable to:
initialize a first replication process between a first storage volume of a first storage system and a second storage volume of a second storage system;
copy, as part of the first replication process, content from a first system snapshot of the first storage volume to a second system snapshot of the first storage volume; and
copy, as part of the first replication process, content from a first user snapshot of the first storage volume to the first system snapshot of the first storage volume, system snapshots being initiated by the first storage system or by the second storage system, and user snapshots being initiated by a user of the first storage system or of the second storage system, or of both, wherein system snapshots are not accessible to the user and user snapshots are accessible to the user.

2. The system of claim 1, wherein the storage controller is further operable to:
copy content from a first system snapshot of the second storage volume to a second system snapshot of the second storage volume.

3. The system of claim 1, wherein the storage controller is further operable to:
copy the content from the first system snapshot of the first storage volume, updated with content from the first user snapshot of the first storage volume, to the first system snapshot of the second storage volume.

4. The system of claim 3, wherein the storage controller is further operable to:
create a first user snapshot of the second storage volume; and
copy content from the first system snapshot of the second storage volume, updated with content from the first system snapshot of the first storage volume, to the first user snapshot of the second storage volume.

5. The system of claim 1, wherein the storage controller is further operable to:
modify data on the first storage volume since the first replication process, wherein modifying data on the first storage volume comprises at least one of adding new data to the first storage volume, removing data from the first storage volume, and modifying existing data on the first storage volume; and
initialize a second replication process between the first storage volume and the second storage volume.

6. The system of claim 5, wherein the storage controller is further operable to:
generate a second user snapshot of the first storage volume after modifying the data on the first storage volume; and
copy content from the first system snapshot on the first storage volume to the second system snapshot on the first storage volume.

7. The system of claim 6, wherein the storage controller is further operable to:
copy content from the second user snapshot of the first storage volume to the first system snapshot of the first storage volume.

8. The system of claim 7, wherein the storage controller is further operable to:
compare content on the updated first system snapshot of the first storage volume to content on the updated second system snapshot of the first storage volume.

9. The system of claim 8, wherein the storage controller is further operable to:
identify delta data on the updated first system snapshot of the first storage volume based on the comparing, wherein delta data comprises at least one of data on the updated first system snapshot of the first storage volume that is not on the updated second system snapshot of the first storage volume and data on the updated second system snapshot of the first storage volume that is not on the updated first system snapshot of the first storage volume.

10. The system of claim 9, wherein the storage controller is further operable to:
copy content from the first system snapshot on the second storage volume to the second system snapshot on the second storage volume; and
copy the delta data on the first system snapshot of the first storage volume to the first system snapshot of the second storage volume.

11. The system of claim 10, wherein the storage controller is further operable to:
generate a second user snapshot on the second storage volume; and
copy content from the first system snapshot of the second storage volume, updated with the delta data, to the second user snapshot of the second storage volume.

12. The system of claim 1, further comprising a storage drive configured for incorporation into a data center or cloud environment, and wherein at least one of the system snapshot and the user snapshot comprise a point in time capture of data on the first storage volume.

13. An apparatus comprising:
a controller operable to:
initialize a first replication process between a first storage volume of a first storage system and a second storage volume of a second storage system;
copy, as part of the first replication process, content from a first system snapshot on the first storage volume to a second system snapshot on the first storage volume; and
copy, as part of the first replication process, content from a first user snapshot of the first storage volume to the first system snapshot of the first storage volume, system snapshots being initiated by the first storage system or by the second storage system, and user snapshots being initiated by a user of the first storage system or of the second storage system, or of both, wherein system snapshots are not accessible to the user and user snapshots are accessible to the user, and at least one of the first and second system snapshots and the first user snapshot comprise a point in time capture of data on the first storage volume.

14. The apparatus of claim 13, wherein the controller is operable to:
copy content from a first system snapshot of the second storage volume to a second system snapshot of the second storage volume.

15. The apparatus of claim 13, wherein the controller is operable to:
copy the content from the first system snapshot of the first storage volume, updated with content from the first user snapshot of the first storage volume, to the first system snapshot of the second storage volume.

16. The apparatus of claim 15, wherein the controller is operable to:
create a first user snapshot of the second storage volume; and
copy content from the first system snapshot of the second storage volume, updated with content from the first system snapshot of the first storage volume, to the first user snapshot of the second storage volume.

17. The apparatus of claim 13, wherein the controller is operable to:
modify data on the first storage volume since the first replication process, wherein modifying data on the first storage volume comprises at least one of adding new data to the first storage volume, removing data from the first storage volume, and modifying existing data on the first storage volume; and
initialize a second replication process between the first storage volume and the second storage volume.

18. The apparatus of claim 17, wherein the controller is operable to:
generate a second user snapshot of the first storage volume after modifying the data on the first storage volume; and
copy content from the first system snapshot on the first storage volume to the second system snapshot on the first storage volume.

19. A method for operating a storage device, the method comprising:
initializing a first replication process between a first storage volume of a first storage system and a second storage volume of a second storage system;
copying, as part of the first replication process, content from a first system snapshot of the first storage volume to a second system snapshot of the first storage volume; and
copying, as part of the first replication process, content from a first user snapshot of the first storage volume to the first system snapshot of the first storage volume, system snapshots being initiated by the first storage system or by the second storage system, and user snapshots being initiated by a user of the first storage system or of the second storage system, or of both, wherein system snapshots are not accessible to the user and user snapshots are accessible to the user.

20. The method of claim 19, the method comprising:
copying content from a first system snapshot of the second storage volume to a second system snapshot of the second storage volume; and
copying the content from the first system snapshot of the first storage volume, updated with content from the first user snapshot of the first storage volume, to the first system snapshot of the second storage volume.

* * * * *